United States Patent
Chang et al.

(10) Patent No.: US 7,830,674 B2
(45) Date of Patent: Nov. 9, 2010

(54) SINGLE-STAGE SWITCHING POWER SUPPLY

(75) Inventors: Shih-Hsien Chang, Taoyuan Hsien (TW); Chih-Hung Yen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 81 days.

(21) Appl. No.: 12/414,503

(22) Filed: Mar. 30, 2009

(65) Prior Publication Data

US 2010/0135044 A1    Jun. 3, 2010

(30) Foreign Application Priority Data

Dec. 2, 2008    (TW) ............................... 97146822 A

(51) Int. Cl.
*H02M 3/335*    (2006.01)
(52) U.S. Cl. .......................................... 363/16; 363/17
(58) Field of Classification Search ................... 363/16, 363/17, 25, 23
See application file for complete search history.

(56) References Cited

U.S. PATENT DOCUMENTS 5,146,394 A * 9/1992 Ishii et al. ..................... 363/16

* cited by examiner

*Primary Examiner*—Shawn Riley
(74) *Attorney, Agent, or Firm*—Kirton & McConkie; Evan R. Witt

(57) ABSTRACT

A single-stage switching power supply includes a transformer, a voltage level generation circuit, a first switching circuit, a second switching circuit, a rectifying and filtering circuit, a feedback circuit and a control circuit. The rectifying and filtering circuit is connected to the secondary winding assembly and the system circuit for generating an output voltage. The feedback circuit generates a feedback signal in response to the output voltage. In response to the feedback signal and an operating-status signal issued by the system circuit, the first and second switching circuits are alternately enabled under control of the control circuit such that electric energy of a first DC voltage is transmitted from the first primary winding assembly to the secondary winding assembly. The first switching circuit is disabled but the second switching circuit is enabled under control of the control circuit when the operating-status signal is at a standby operating status.

20 Claims, 9 Drawing Sheets

SINGLE-STAGE SWITCHING POWER SUPPLY

FIELD OF THE INVENTION

The present invention relates to a power supply, and more particularly to a single-stage switching power supply.

BACKGROUND OF THE INVENTION

Power supply apparatuses are essential for many electronic appliances such as personal computers, industrial computers, servers, communication products or network products. Usually, the user may simply plug a power supply into an AC wall outlet commonly found in most homes or offices so as to receive an AC voltage. The power supply can convert the AC voltage into a regulated DC output voltage for powering the electronic device and/or charging a battery built-in the electronic device.

Generally, power supply apparatuses are classified into two types, i.e. a linear power supply and a switching power supply (SPS). A linear power supply principally comprises a transformer, a diode rectifier and a capacitor filter. The linear power supply is advantageous due to its simplified circuitry and low fabricating cost. Since the linear power supply has bulky volume, the linear power supply is not applicable to a slim-type electronic device. In addition, the converting efficiency of the linear power supply is too low to comply with the power-saving requirements. In comparison with the linear power supply, the switching power supply has reduced volume but increased converting efficiency. That is, the switching power supply is applicable to the slim-type electronic device and may meet with the power-saving requirements.

For maintaining normal operation of the electronic device, the switching power supply needs to provide sufficient power to the electronic device. For example, if the maximum power consumed by the electronic device is 400 watt, the switching power supply is usually designed to provide power of 400 watt or more. In addition, since the switching power supply generates the DC voltage for powering the electronic device by selectively conducting or shutting off many switch elements, many switch elements are necessary to provide a greater magnitude of power. As known, the switch elements are still selectively conducted or shut off even when the switching power supply is operated in a standby status or a power-saving status. The process of selectively conducting or shutting off the switch elements results in additional switching loss. In addition, the overall efficiency of the switching power supply is impaired.

Moreover, since the AC current inputted into the switching power supply is centrally distributed, the harmonic wave generated by the switching power supply may interfere with other electronic devices, reduce the power factor and increase the apparent power. Under this circumstance, the switching power supply needs more power and the power loss is high.

Therefore, there is a need of providing a single-stage switching power supply to obviate the drawbacks encountered from the prior art.

SUMMARY OF THE INVENTION

It is an object of the present invention to provide a single-stage switching power supply for adaptively enabling proper number of switch elements in order to reduce the switching loss at the standby status and enhance the overall performance.

Another object of the present invention provides a single-stage switching power supply having a function of power factor correction in order to reduce the adverse influence of the harmonic wave.

A further object of the present invention provides a single-stage switching power supply having a simplified circuitry configuration.

In accordance with an aspect of the present invention, there is provided a single-stage switching power supply for generating an output voltage to a system circuit. The single-stage switching power supply includes a transformer, a voltage level generation circuit, a first switching circuit, a second switching circuit, a rectifying and filtering circuit, a feedback circuit and a control circuit. The transformer has a first primary winding assembly and a secondary winding assembly. The voltage level generation circuit is connected to the first primary winding assembly for generating an auxiliary voltage. The first switching circuit is connected to the first primary winding assembly, an input-side common terminal and the voltage level generation circuit, and includes a first switch element and a second switch element. The second switching circuit is connected to the voltage level generation circuit, the first primary winding assembly and the input-side common terminal, and includes a third switch element. The rectifying and filtering circuit is connected to the secondary winding assembly and the system circuit for rectifying, filtering and generating the output voltage. The feedback circuit is connected to the rectifying and filtering circuit and generates a feedback signal in response to the output voltage. The control circuit is connected to the first switching circuit, the second switching circuit, the feedback circuit and the system circuit. In response to the feedback signal and an operating-status signal issued by the system circuit, the first switching circuit and the second switching circuit are alternately enabled under control of the control circuit such that electric energy of a first DC voltage is transmitted from the first primary winding assembly to the secondary winding assembly. The first switching circuit is disabled but the second switching circuit is enabled under control of the control circuit when the operating-status signal is at a standby operating status.

In accordance with another aspect of the present invention, there is provided a single-stage switching power supply for generating an output voltage to a system circuit. The single-stage switching power supply includes a transformer, a voltage level generation circuit, a first switching circuit, a second switching circuit, a rectifying and filtering circuit, a feedback circuit and a control circuit. The transformer has a first primary winding assembly, a second primary winding assembly and a secondary winding assembly. The voltage level generation circuit is connected to the first primary winding assembly or the second primary winding assembly for generating an auxiliary voltage. The first switching circuit is connected to the first primary winding assembly, the second primary winding assembly, an input-side common terminal and the voltage level generation circuit, and includes a first switch element and a second switch element. The second switching circuit is connected to the first primary winding assembly or the second primary winding assembly and the input-side common terminal, and includes a third switch element. The rectifying and filtering circuit is connected to the secondary winding assembly and the system circuit for rectifying, filtering and generating the output voltage. The feedback circuit is connected to the rectifying and filtering circuit and generates a feedback signal in response to the output voltage. The control circuit is connected to the first switching circuit, the second switching circuit, the feedback circuit and the system circuit. In response to the feedback signal and an operating-status signal issued by the system circuit, the first switching circuit and the second switching circuit are alternately enabled under control of the control circuit, such that electric energy of a first DC voltage is transmitted from the first primary winding assembly or the second primary winding assembly to the secondary winding assembly. The first switching circuit is disabled but the second switching circuit is enabled under control of the control circuit when the operating-status signal is at a standby operating status.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
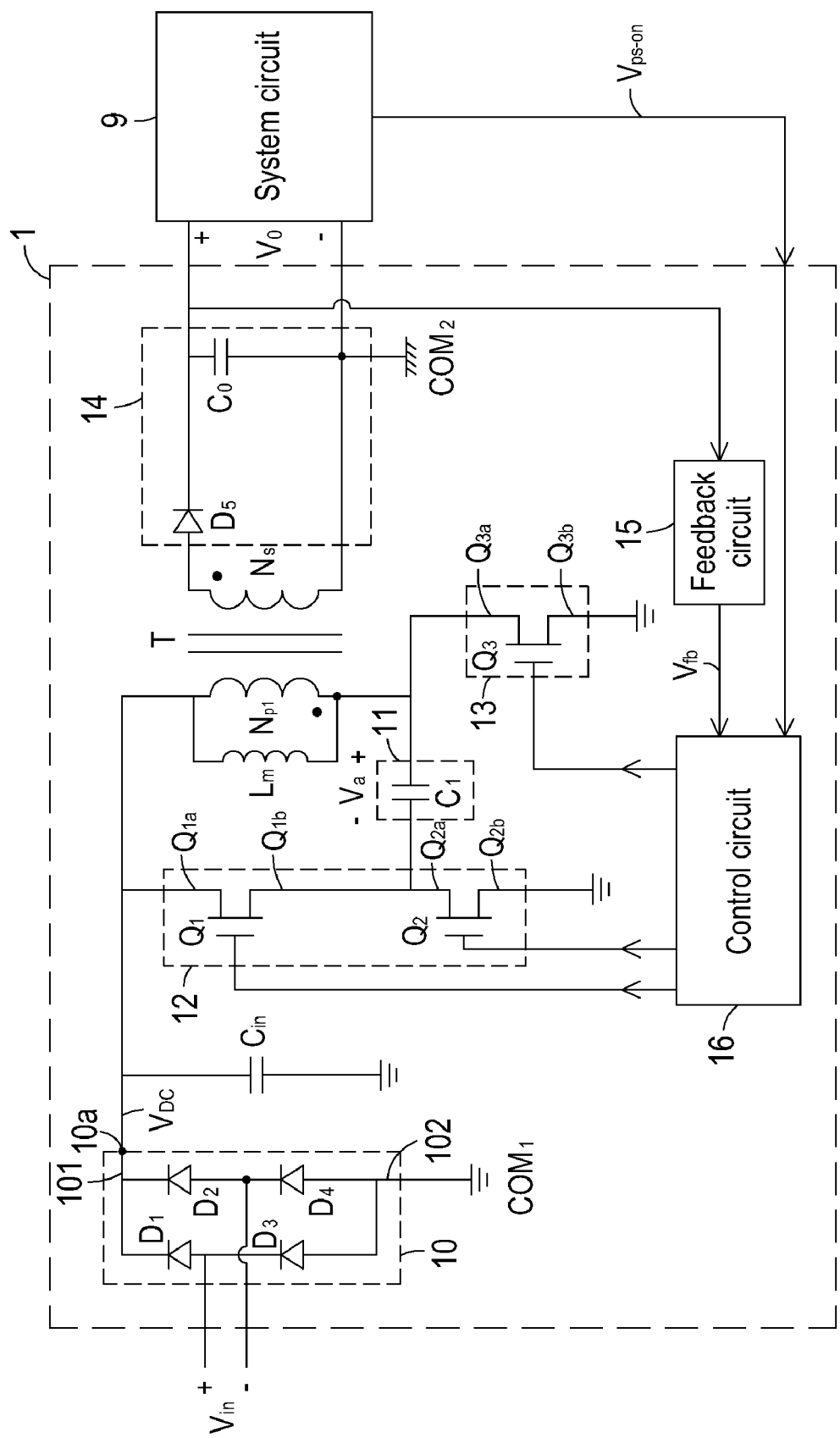
FIG. 1 is a schematic circuit diagram of a single-stage switching power supply according to a first preferred embodiment of the present invention.

FIG. 1 is a schematic circuit diagram of a single-stage switching power supply according to a first preferred embodiment of the present invention. The single-stage switching power supply 1 is used to generate an output voltage $V_o$ to a system circuit 9. As shown in FIG. 1, the single-stage switching power supply 1 principally comprises a transformer T, a rectifying circuit 10, a voltage level generation circuit 11, a first switching circuit 12, a second switching circuit 13, a rectifying and filtering circuit 14, a feedback circuit 15, a control circuit 16 and an input capacitor $C_{in}$.

The transformer T has a first primary winding assembly $N_{p1}$ and a secondary winding assembly $N_s$. A first output terminal 10a of the rectifying circuit 10 is connected to a first end of the first primary winding assembly $N_{p1}$. An input AC voltage $V_{in}$ is rectified by the rectifying circuit 10 into a first DC voltage $V_{DC}$, which is outputted from the first output terminal 10a.

In this embodiment, since the single-stage switching power supply 1 includes the rectifying circuit 10, the input AC voltage $V_{in}$ needs to rectified by the rectifying circuit 10 into a first DC voltage $V_{DC}$. In a case that the rectifying circuit 10 is exempted from the single-stage switching power supply 1, the first DC voltage $V_{DC}$ is directly received by the single-stage switching power supply 1.

Please refer to FIG. 1 again. A first end of the voltage level generation circuit 11 is connected to the other end of the first primary winding assembly $N_{p1}$. The second end of the voltage level generation circuit 11 is connected to the first switching circuit 12. An auxiliary voltage $V_a$ across both ends of the voltage level generation circuit 11 is generated during operation of the single-stage switching power supply 1. The first switching circuit 12 is connected to the first primary winding assembly $N_{p1}$ of the transformer T, the input-side common terminal $COM_1$, the voltage level generation circuit 11 and the control circuit 16. The second switching circuit 13 is connected between the second end of the first primary winding assembly $N_{p1}$ and the input-side common terminal $COM_1$. The control terminal of the second switching circuit 13 is connected to the control circuit 16. The operations of the first switching circuit 12 and the second switching circuit 13 are controlled by the control circuit 16. The rectifying and filtering circuit 14 is connected to the secondary winding assembly $N_s$ of transformer T and the system circuit 9 for rectifying, filtering and generating the output voltage $V_o$. The feedback circuit 15 is connected to the rectifying and filtering circuit 14 and the system circuit 9. In response to the output voltage $V_o$, the feedback circuit 15 generates a feedback signal $V_{fb}$. The input capacitor $C_{in}$ is interconnected between the first output terminal 1a of the rectifying circuit 10 and the input-side common terminal COM, for filtering the first DC voltage $V_{DC}$.

The control circuit 16 is connected to the control terminal of the first switching circuit 12, the control terminal of the second switching circuit 13, the output terminal of the feedback circuit 15 and the system circuit 9. An example of the control circuit 16 is a pulse width modulation (PWM) controller or a digital signal processor (DSP). In response to the feedback signal $V_{fb}$ issued by the feedback circuit 15 and the operating-status signal $V_{ps-on}$, the first switching circuit 12 and the second switching circuit 13 are alternately enabled. As such, the electric energy of the first DC voltage $V_{DC}$ will be transmitted from the first primary winding assembly $N_{p1}$ to the secondary winding assembly $N_s$. In a case that the operating-status signal $V_{ps-on}$ is at a normal operating status, the first switching circuit 12 is enabled but the second switching circuit 13 is disabled under control of the control circuit 16. When the first switching circuit 12 is enabled, the first switching circuit 12 is alternately conducted or shut off and thus the electric energy of the first DC voltage $V_{DC}$ is transmitted from the first primary winding assembly $N_{p1}$ to the secondary winding assembly $N_s$. Whereas, in a case that the operating-status signal $V_{ps-on}$ is at a standby status, the first switching circuit 12 is disabled but the second switching circuit 13 is enabled under control of the control circuit 16. When the second switching circuit 13 is enabled, the second switching circuit 13 is alternately conducted or shut off and thus the electric energy of the first DC voltage $V_{DC}$ is transmitted from the first primary winding assembly $N_{p1}$ to the secondary winding assembly $N_s$.

Each of the first switching circuit 12 and the second switching circuit 13 includes one or more switch elements. In this embodiment, the number of switch elements of the first switching circuit 12 is more than that of the second switching circuit 13. In a case that the first switching circuit 12 is enabled but the second switching circuit 13 is disabled, more switch elements are interacted such that electric energy of the first DC voltage $V_{DC}$ is transmitted from the first primary winding assembly $N_{p1}$ to the secondary winding assembly $N_s$. Whereas, in another case that the first switching circuit 12 is disabled but the second switching circuit 13 is enabled, less switch elements are interacted such that electric energy of the first DC voltage $V_{DC}$ is transmitted from the first primary winding assembly $N_{p1}$ to the secondary winding assembly $N_s$.

Since the first switching circuit 12 has more switch elements, more electric energy of the first DC voltage $V_{DC}$ is transmitted from the first primary winding assembly $N_{p1}$ to the secondary winding assembly $N_s$ when the first switching circuit 12 is enabled. In other words, more electric energy (watt) is transmitted from the single-stage switching power supply 1 to the system circuit 9 when the first switching circuit 12 is enabled. Whereas, when the second switching circuit 13 is enabled, less electric energy of the first DC voltage $V_{DC}$ is transmitted from the first primary winding assembly $N_{p1}$ to the secondary winding assembly $N_s$ because the second switching circuit 13 has less switch elements.

On the other hand, the switching loss of the first switching circuit 12 is greater than that of the second switching circuit 13 because the first switching circuit 12 has more switch elements. In this embodiment, the first switching circuit 12 includes two switch elements and the second switching circuit 13 includes one switch element. Since the first switching circuit 12 has more switch elements than the second switching circuit 13, the switching loss of the second switching circuit 13 is respectively lower.

The first switching circuit 12 includes a first switch element $Q_1$ and a second switch element $Q_2$. The second switching circuit 13 includes a third switch element $Q_3$. The first end $Q_{1a}$ of the first switch element $Q_1$ is connected to the first end of the first primary winding assembly $N_{p1}$. The second end $Q_{1b}$ of the first switch element $Q_1$ is connected to the first end $Q_{2a}$ of the second switch element $Q_2$ and the voltage level generation circuit 11. The second end $Q_{2b}$ of the second switch element $Q_2$ is connected to the input-side common terminal $COM_1$. The first end $Q_{3a}$ of the third switch element $Q_3$ is connected to the second end of the first primary winding assembly $N_{p1}$. The second end $Q_{3b}$ of the third switch element $Q_3$ is connected to the input-side common terminal $COM_1$. The control terminals of the first switch element $Q_1$, the second switch element $Q_2$ and the third switch element $Q_3$ are connected to the control circuit 16. Under control of the control circuit 16, the first switch element $Q_1$, the second switch element $Q_2$ and the third switch element $Q_3$ are alternately conducted or shut off, so that the electric energy of the first DC voltage $V_{DC}$ is transmitted from the first primary winding assembly $N_{p1}$ to the secondary winding assembly $N_s$.

In this embodiment, the voltage level generation circuit 11 includes a first capacitor $C_1$. Alternatively, the voltage level generation circuit 11 includes an auxiliary transformer (not shown). An end of the first capacitor $C_1$ is connected to the second end of the first primary winding assembly $N_{p1}$. The other end of the first capacitor $C_1$ is connected to the second end $Q_{1b}$ of the first switch element $Q_1$ and the first end $Q_{2a}$ of the second switch element $Q_2$. During operation of the single-stage switching power supply 1, the auxiliary voltage $V_a$ across both ends of the voltage level generation circuit 11 is generated.

In the equivalent circuit of the transformer T, the first primary winding assembly $N_{p1}$ is connected with a magnetizing inductor $L_m$ such that the transformer T is magnetized to have a property of an inductor. The rectifying circuit 10 includes a bridge rectifier that comprises a first diode $D_1$, a second diode $D_2$, a third diode $D_3$ and a fourth diode $D_4$. The positive output terminal 101 of the bridge rectifier is connected to the first output terminal 10a of the rectifying circuit 10. The negative output terminal 102 of the bridge rectifier is connected to the input-side common terminal $COM_1$. After the input AC voltage $V_{in}$ is received by the bridge rectifier, the input AC voltage $V_{in}$ is rectified into the first DC voltage $V_{DC}$.

The rectifying and filtering circuit 14 comprises a fifth diode $D_5$ and an output capacitor $C_o$. The positive end of the fifth diode $D_5$ is connected to a first end of the secondary winding assembly $N_s$. The negative end of the fifth diode $D_5$ is connected to the output capacitor $C_o$ and an end of the system circuit 9. The output capacitor $C_o$ is also connected to the other end of the system circuit 9, the second end of the secondary winding assembly $N_s$ and the output-side common terminal $COM_2$. An example of each of the first switch element $Q_1$, the second switch element $Q_2$ and the third switch element $Q_3$ includes but is not limited to a bipolar junction transistor (BJT), or a metal oxide semiconductor field effect transistor (MOSFET).

Figure 2A:
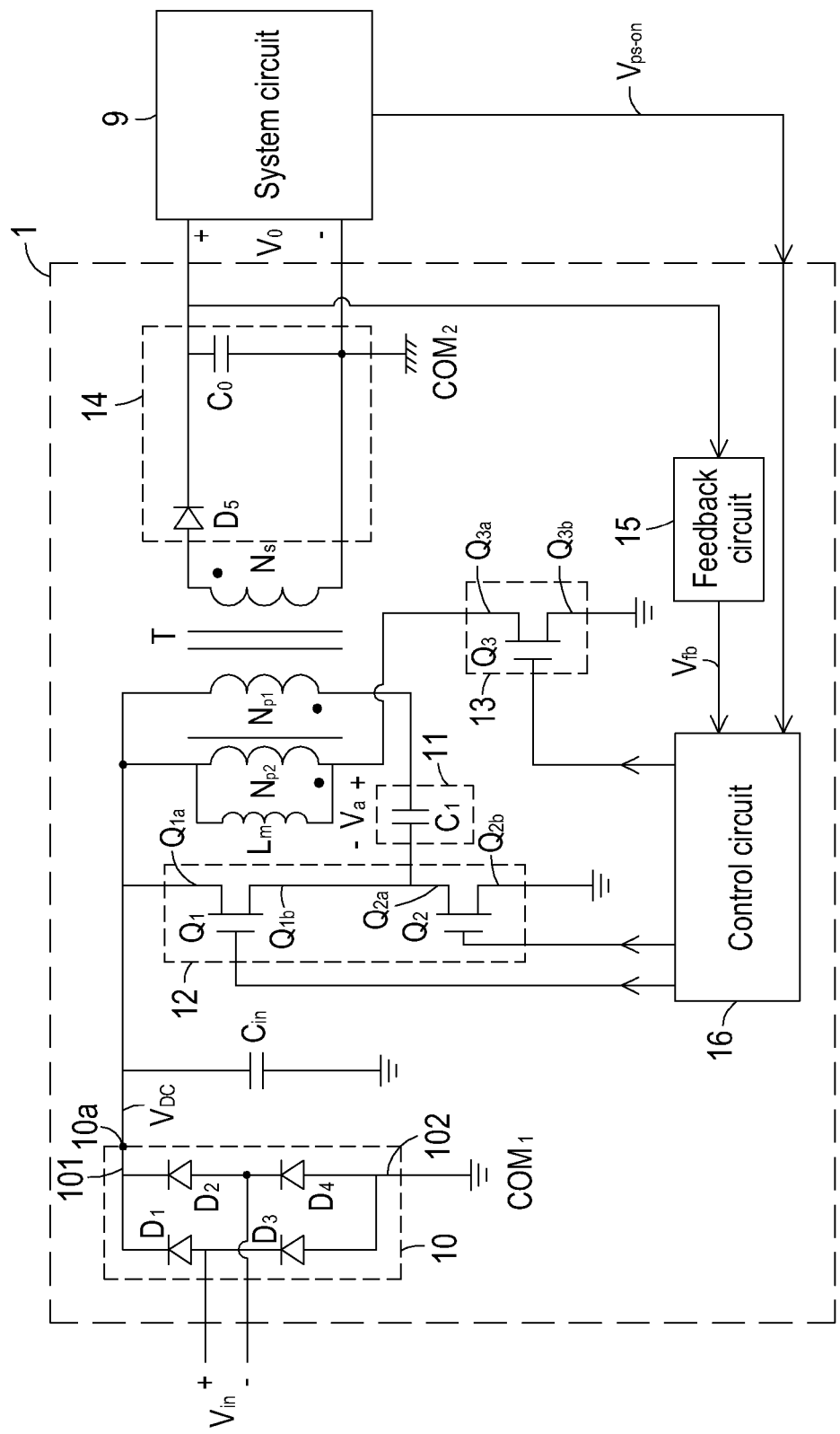
FIG. 2A is a schematic circuit diagram of a single-stage switching power supply according to a second preferred embodiment of the present invention.

FIG. 2A is a schematic circuit diagram of a single-stage switching power supply according to a second preferred embodiment of the present invention. In comparison with the single-stage switching power supply of FIG 1, the transformer T further includes a second primary winding assembly $N_{p2}$ and the connecting relation between the second switching circuit 13 and the primary side of the transformer T is distinguished. In this embodiment, a first end of the second primary winding assembly $N_{p2}$ is connected to the first end of the first primary winding assembly $N_{p1}$, the first output terminal 10a of the rectifying circuit 10, the input capacitor $C_{in}$ and the first switching circuit 12. The second switching circuit 13 is connected to a second end of the second primary winding assembly $N_{p2}$ and the input-side common terminal $COM_1$. Likewise, the second primary winding assembly $N_{p2}$ is connected with a magnetizing inductor $L_m$ such that the transformer T is magnetized to have a property of an inductor.

The operation principles of the single-stage switching power supply 1 of FIG. 2A are similar to those of FIG. 1. In a case that the operating-status signal $V_{ps-on}$ is at a normal operating status, the first switching circuit 12 is enabled but the second switching circuit 13 is disabled under control of the control circuit 16. In another case that the operating-status signal $V_{ps-on}$ is at a standby status, the first switching circuit 12 is disabled but the second switching circuit 13 is enabled under control of the control circuit 16. In this embodiment, however, the electric energy of the first DC voltage $V_{DC}$ is transmitted from the second primary winding assembly $N_{p2}$ to the secondary winding assembly $N_s$.

Figure 2B:
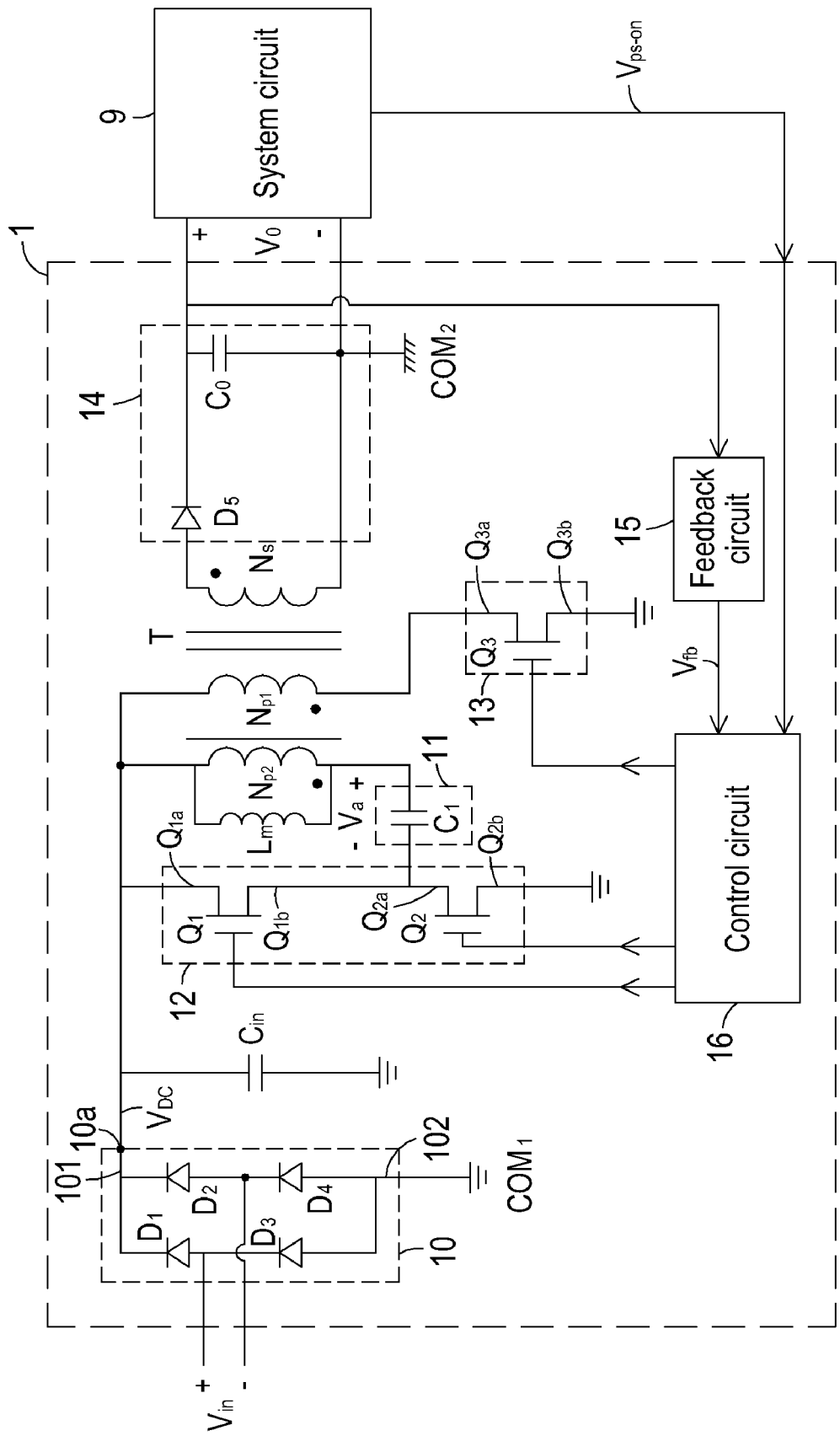
FIG. 2B is a schematic circuit diagram of a single-stage switching power supply according to a third preferred embodiment of the present invention.

FIG. 2B is a schematic circuit diagram of a single-stage switching power supply according to a third preferred embodiment of the present invention. In comparison with the single-stage switching power supply of FIG. 2A, the connecting relations between the second switching circuit 13, the voltage level generation circuit 11 and the primary side of the transformer T are distinguished. In this embodiment, the second switching circuit 13 is connected to the second end of the first primary winding assembly $N_{p1}$, and the voltage level generation circuit 11 is connected to the second end of the second primary winding assembly $N_{p2}$.

The operation principles of the single-stage switching power supply 1 of FIG. 2B are similar to those of FIG. 2A. In a case that the operating-status signal $V_{ps-on}$ is at a normal operating status, the first switching circuit 12 is enabled but the second switching circuit 13 is disabled under control of the control circuit 16. In another case that the operating-status signal $V_{ps-on}$ is at a standby status, the first switching circuit 12 is disabled but the second switching circuit 13 is enabled under control of the control circuit 16. In this embodiment, however, the electric energy of the first DC voltage $V_{DC}$ is transmitted from the second primary winding assembly $N_{p2}$ to the secondary winding assembly $N_s$ when the first switching circuit 12 is enabled; but the electric energy of the first DC voltage $V_{DC}$ is transmitted from the first primary winding assembly $N_{p1}$ to the secondary winding assembly $N_s$ when the second switching circuit 13 is enabled.

Figure 3:
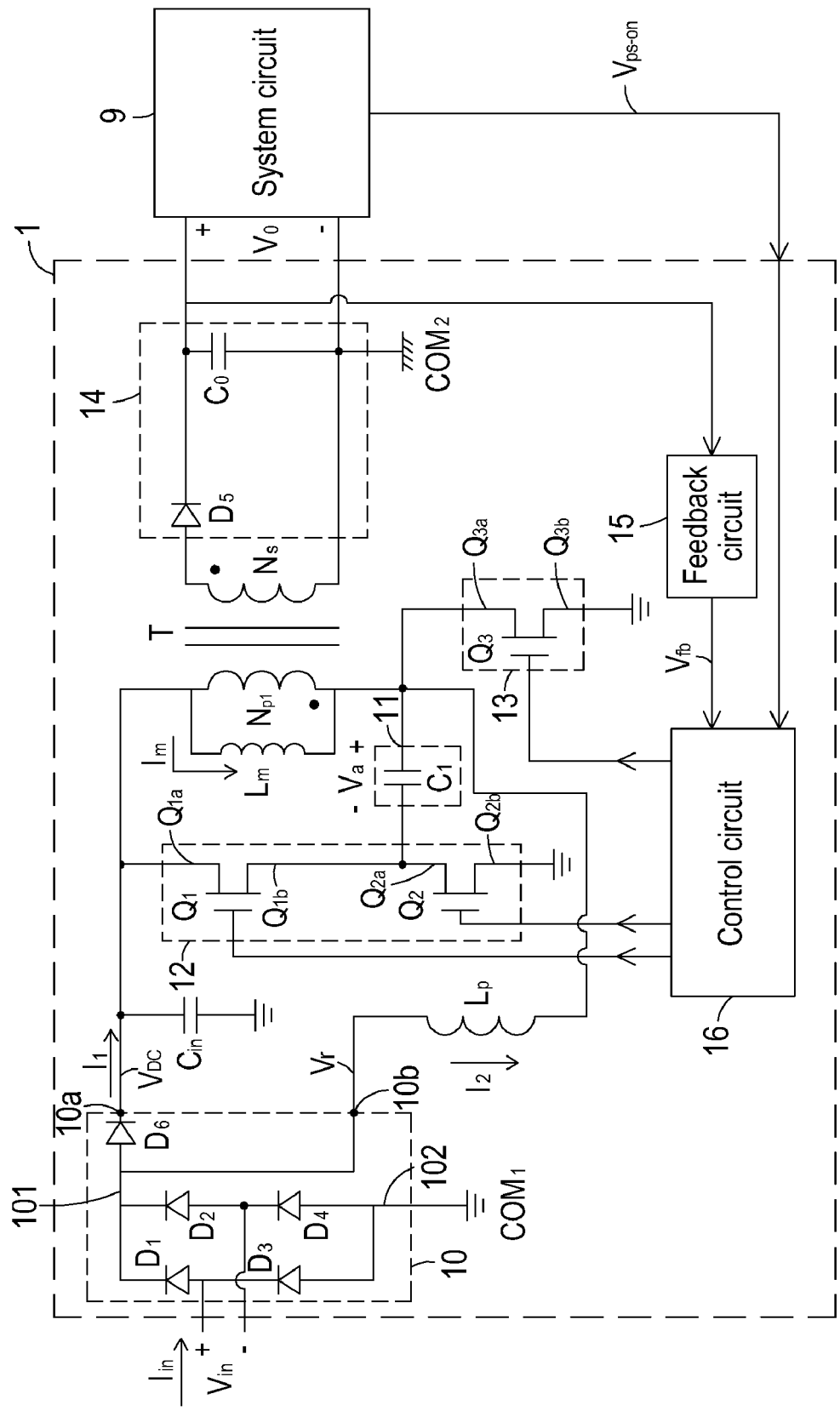
FIG. 3 is a schematic circuit diagram of a single-stage switching power supply according to a fourth preferred embodiment of the present invention.

FIG. 3 is a schematic circuit diagram of a single-stage switching power supply according to a fourth preferred embodiment of the present invention. In comparison with the single-stage switching power supply of FIG. 1, the single-stage switching power supply 1 of FIG. 3 further includes a first inductor $L_p$ and the rectifying circuit 10 further includes a second output terminal 10b. The rectifying circuit 10 issues a rectified output voltage $V_r$ from the second output terminal 10b. The first inductor $L_p$ is interconnected between the primary side of the transformer T and the second output terminal 10b of the rectifying circuit 10 for improving the power factor of the single-stage switching power supply 1. In this embodiment, an end of the first inductor $L_p$ is connected to the second output terminal 10b of the rectifying circuit 10, and the other end of the first inductor $L_p$ is connected to the first primary winding assembly $N_{p1}$, the voltage level generation circuit 11 and the second switching circuit 13.

The rectifying circuit 10 includes a bridge rectifier that comprises a first diode $D_1$, a second diode $D_2$, a third diode $D_3$ and a fourth diode $D_4$. In addition, the rectifying circuit 10 further includes a sixth diode $D_6$. The sixth diode $D_6$ is interconnected between the positive output terminal 101 of the bridge rectifier and the first output terminal 10a of the rectifying circuit 10. The positive end of the sixth diode $D_6$ is connected to the negative ends of the first diode $D_1$ and the second diode $D_2$. The negative end of the sixth diode $D_6$ is connected to the first output terminal 10a of the rectifying circuit 10. The second output terminal 10b of the rectifying circuit 10 is connected to the positive end of the sixth diode $D_6$ and the positive output terminal 101 of the bridge rectifier.

Figure 4A:
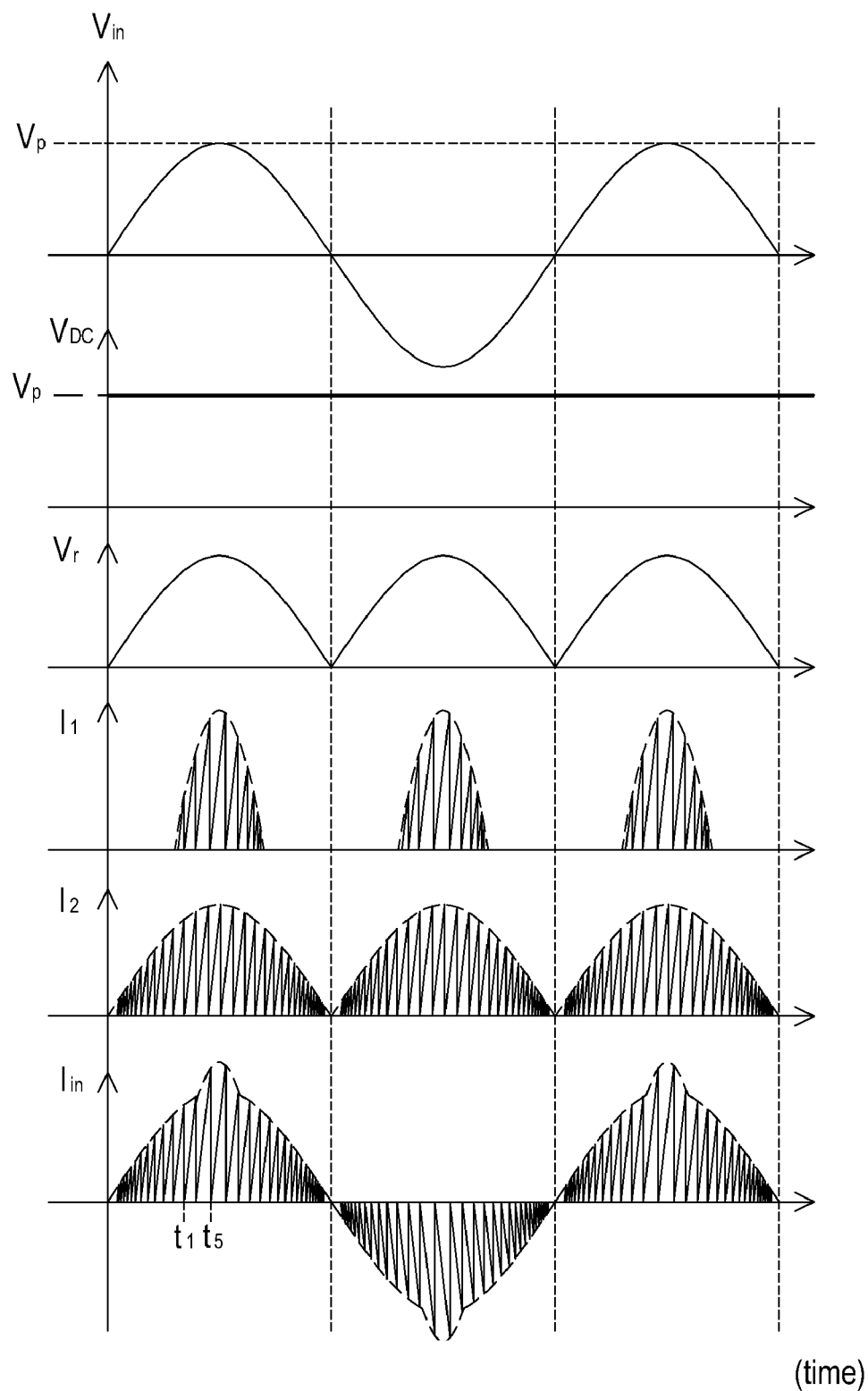
FIG. 4A is a timing waveform diagram schematically illustrating related voltage signals and current signals described in the single-stage switching power supply of FIG. 3.

FIG. 4A is a timing waveform diagram schematically illustrating related voltage signals and current signals described in the single-stage switching power supply of FIG. 3. As shown in FIG. 4A, the input AC voltage $V_{in}$ is a sine wave that is described mathematically as a function of time by the equation: $V_{in}=V_p \cdot \sin(\omega t)$, in which $V_p$ is a peak voltage. The input AC voltage $V_{in}$ is rectified by the rectifying circuit 10 into the first DC voltage $V_{DC}$, which is outputted from the first output terminal 10a. The rectified output voltage $V_r$ is issued from the second output terminal 10b of the rectifying circuit 10. The magnitude of the first DC voltage $V_{DC}$ is substantially equal to the peak voltage $V_p$ of the input AC voltage $V_{in}$.

As shown in FIG. 3, a first current $I_1$ flows from the first output terminal 10a of the rectifying circuit 10 to the primary side of the transformer T. In addition, a second current $I_2$ flows from the second output terminal 10b of the rectifying circuit 10 to the primary side of the transformer T. Since the envelop curve of the second current $I_2$ is substantially identical to the waveform of the rectified output voltage $V_r$, the second current $I_2$ is highly dependent on the input AC voltage $V_{in}$. Since the input current $I_{in}$ of the single-stage switching power supply 1 is approximately equal to the sum of the first current $I_1$ and the second current $I_2$. As a consequence, the waveform of the input current $I_{in}$ is the combination of the waveform of the first current $I_1$ and the waveform of the second current $I_2$. As shown in FIG. 4A, the waveform of the input current $I_{in}$ is similar to the waveform of the input AC voltage $V_{in}$.

Figure 4B:
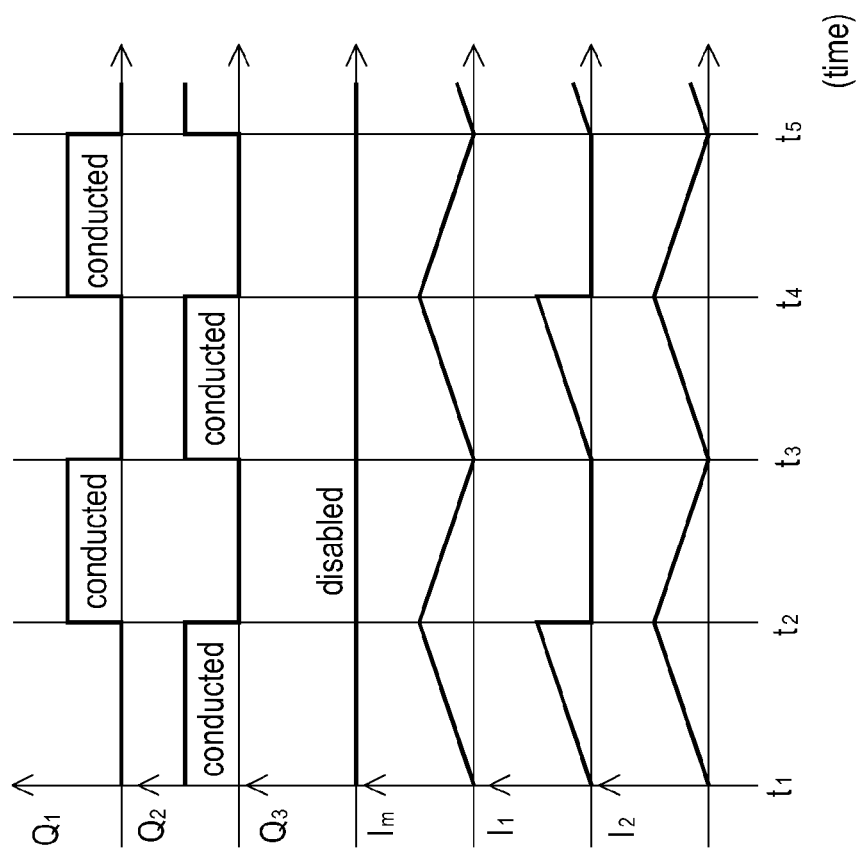
FIG. 4B is a timing waveform diagram schematically illustrating related current signals and the statuses of the switch elements described in the single-stage switching power supply of FIG. 3, in which the operating-status signal is at a normal operating status.

FIG. 4B is a timing waveform diagram schematically illustrating related current signals and the statuses of the switch elements described in the single-stage switching power supply of FIG. 3, in which the operating-status signal is at a normal operating status. Since the operating-status signal $V_{ps-on}$ is at the normal operating status, the third switch element $Q_3$ of the second switching circuit 13 is disabled but the first switch element $Q_1$ and the second switch element $Q_2$ of the first switching circuit 12 is enabled. As such, the electric energy of the first DC voltage $V_{DC}$ is transmitted from the first primary winding assembly $N_{p1}$ to the secondary winding assembly $N_s$.

From the time spot $t_1$ to the time spot $t_2$, the first switch element $Q_1$ is shut off but the second switch element $Q_2$ is conducted. Meanwhile, the electric energy is stored in the magnetizing inductor $L_m$ and the first inductor $L_p$ (charge state), so that the magnitudes of the magnetizing current $I_m$ flowing through the magnetizing inductor $L_m$, the first current $I_1$ and the second current $I_2$ are increased as time elapses. Since the voltage difference between both ends of the first primary winding assembly $N_{p1}$ or the magnetizing inductor $L_m$ is equal to $(V_p-V_a)$, the magnetizing current $I_m$ and the first current $I_1$ are increased at a slope of $(V_p-V_a)/L_m$ and flow through the first primary winding assembly $N_{p1}$, the magnetizing inductor $L_m$, the first capacitor $C_1$ and the second switch element $Q_2$. In addition, since the voltage difference between both ends of the first inductor $L_p$ is equal to $(V_r-V_a)$, the second current $I_2$ is increased at a slope of $(V_r-V_a)/L_p$, $(|V_p \cdot \sin(\omega t)|-V_a)/L_p$ or $(|V_{in}|-V_a)/L_p$ and flows through the first inductor $L_p$, the first capacitor $C_1$ and the second switch element $Q_2$.

From the time spot $t_2$ to the time spot $t_3$, the first switch element $Q_1$ is conducted but the second switch element $Q_2$ is shut off. Meanwhile, the magnetizing inductor $L_m$ and the first inductor $L_p$ discharge the electric energy (discharge state), so that the magnitudes of the magnetizing current $I_m$, the first current $I_1$ and the second current $I_2$ are decreased as time elapses. Since the voltage difference between both ends of the first primary winding assembly $N_{p1}$ or the magnetizing inductor $L_m$ is equal to $V_a$, the magnetizing current $I_m$ is decreased at a slope of $V_a/L_m$ and flows through the first primary winding assembly $N_{p1}$, the magnetizing inductor $L_m$, the first capacitor $C_1$ and the first switch element $Q_1$. In addition, since the voltage difference between both ends of the first inductor $L_p$ is equal to $(V_p+V_a-V_r)$, the second current $I_2$ is decreased at a slope of $(V_p+V_a-V_r)/L_p$, $(V_p+V_a-|V_p \cdot \sin(\omega t)|)/L_p$ or $(V_p+V_a-|V_{in}|)/L_p$ and flows through the first inductor $L_p$, the first capacitor $C_1$ and the first switch element $Q_1$. It is found that the second current $I_2$ is highly related to the waveform of the input AC voltage $V_{in}$, and the envelop curve of the second current $I_2$ is substantially identical to the waveform of the input AC voltage $V_{in}$. As a consequence, the single-stage switching power supply 1 is capable of correcting power factor during the operating-status signal $V_{ps-on}$ is at the normal operating status.

From the time spot $t_3$ to the time spot $t_4$, the first switch element $Q_1$ is shut off but the second switch element $Q_2$ is conducted. Similar to the operating mechanism from the time spot $t_1$ to the time spot $t_2$, the electric energy is stored in the magnetizing inductor $L_m$ and the first inductor $L_p$ (charge state). In addition, the variations of the magnetizing current $I_m$, the first current $I_1$ and the second current $I_2$ are also similar to those from the time spot $t_1$ to the time spot $t_2$. From the time spot $t_4$ to the time spot $t_5$, the first switch element $Q_1$ is conducted but the second switch element $Q_2$ is shut off. Similar to the operating mechanism from the time spot $t_2$ to the time spot $t_3$, the magnetizing inductor $L_m$ and the first inductor $L_p$ discharge the electric energy (discharge state). In addition, the variations of the magnetizing current $I_m$, the first current $I_1$ and the second current $I_2$ are also similar to those from the time spot $t_2$ to the time spot $t_3$.

Figure 4C:
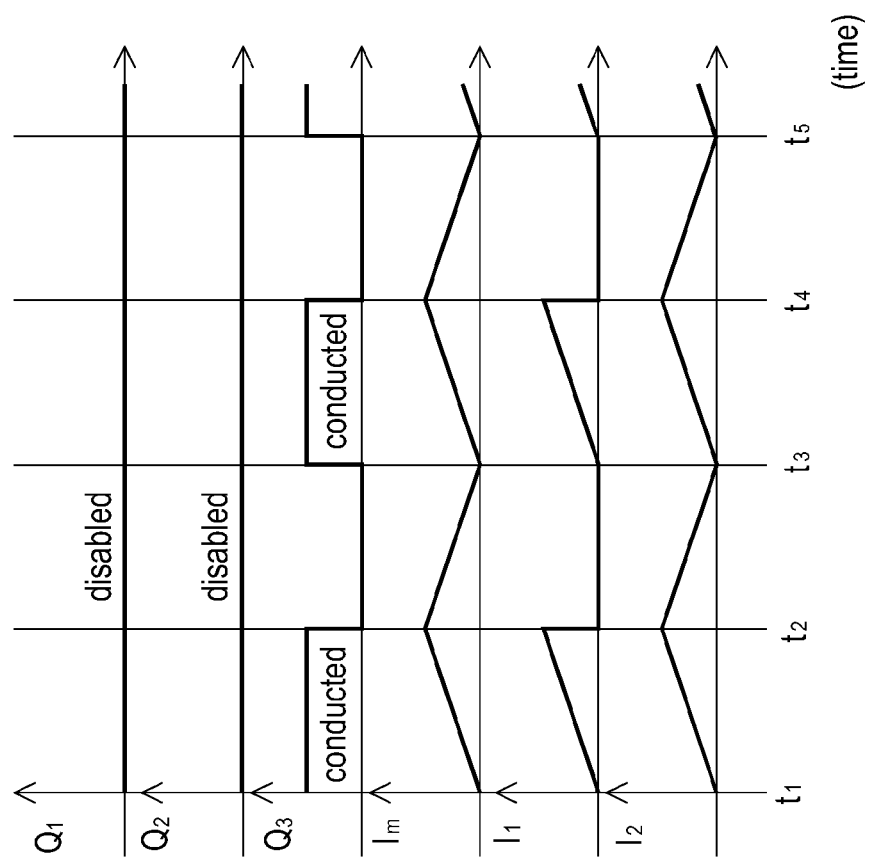
FIG. 4C is a timing waveform diagram schematically illustrating related current signals and the statuses of the switch elements described in the single-stage switching power supply of FIG. 3, in which the operating-status signal is at a standby operating status.

FIG. 4C is a timing waveform diagram schematically illustrating related current signals and the statuses of the switch elements described in the single-stage switching power supply of FIG. 3, in which the operating-status signal is at a standby operating status. Since the operating-status signal $V_{ps\text{-}on}$ is at the standby status, the first switch element $Q_1$ and the second switch element $Q_2$ of the first switching circuit 12 is disabled but the third switch element $Q_3$ of the second switching circuit 13 is enabled. The third switch element $Q_3$ is alternately conducted or shut off. As such, the electric energy of the first DC voltage $V_{DC}$ is transmitted from the first primary winding assembly $N_{p1}$ to the secondary winding assembly $N_s$.

When the magnetizing inductor $L_m$ and the first inductor $L_p$ are at the charge state and the voltage difference between both ends of the first primary winding assembly $N_{p1}$ or the magnetizing inductor $L_m$ is equal to $V_p$, the magnetizing current $I_m$ and the first current $I_1$ are increased at a slope of $V_p/L_m$ and flows through the first primary winding assembly $N_{p1}$, the magnetizing inductor $L_m$, the first capacitor $C_1$ and the third switch element $Q_3$. In addition, since the voltage difference between both ends of the first inductor $L_p$ is equal to $V_r$, the second current $I_2$ is increased at a slope of $V_r/L_p$, $|V_p\cdot\sin(\omega t)|/L_p$ or $|V_{in}|/L_p$ and flows through the first inductor $L_p$, the first capacitor $C_1$ and the third switch element $Q_3$. When the magnetizing inductor $L_m$ and the first inductor $L_p$ are at the discharge state and the voltage difference between both ends of the first primary winding assembly $N_{p1}$ or the magnetizing inductor $L_m$ is equal to $nV_o$, the magnetizing current $I_m$ is decreased at a slope of $nV_o/L_m$, wherein n is the turn ratio of the first primary winding assembly $N_{p1}$ to the secondary winding assembly $N_s$. Meanwhile, the magnetizing current $I_m$ flows through the first primary winding assembly $N_{p1}$ and the magnetizing inductor $L_m$. In addition, since the voltage difference between both ends of the first inductor $L_p$ is equal to $(V_p+nV_o-V_r)$, the second current $I_2$ is decreased at a slope of $(V_p+nV_o-V_r)/L_p$, $(V_p+nV_o-|V_p\cdot\sin(\omega t)|)/L_p$ or $(V_p+nV_o-|V_{in}|)/L_p$. It is found that the second current $I_2$ is highly related to the waveform of the input AC voltage $V_{in}$, and the envelop curve of the second current $I_2$ is substantially identical to the waveform of the input AC voltage $V_{in}$. As a consequence, the single-stage switching power supply 1 is also capable of correcting power factor during the operating-status signal $V_{ps\text{-}on}$ is at the standby status.

Figure 5:
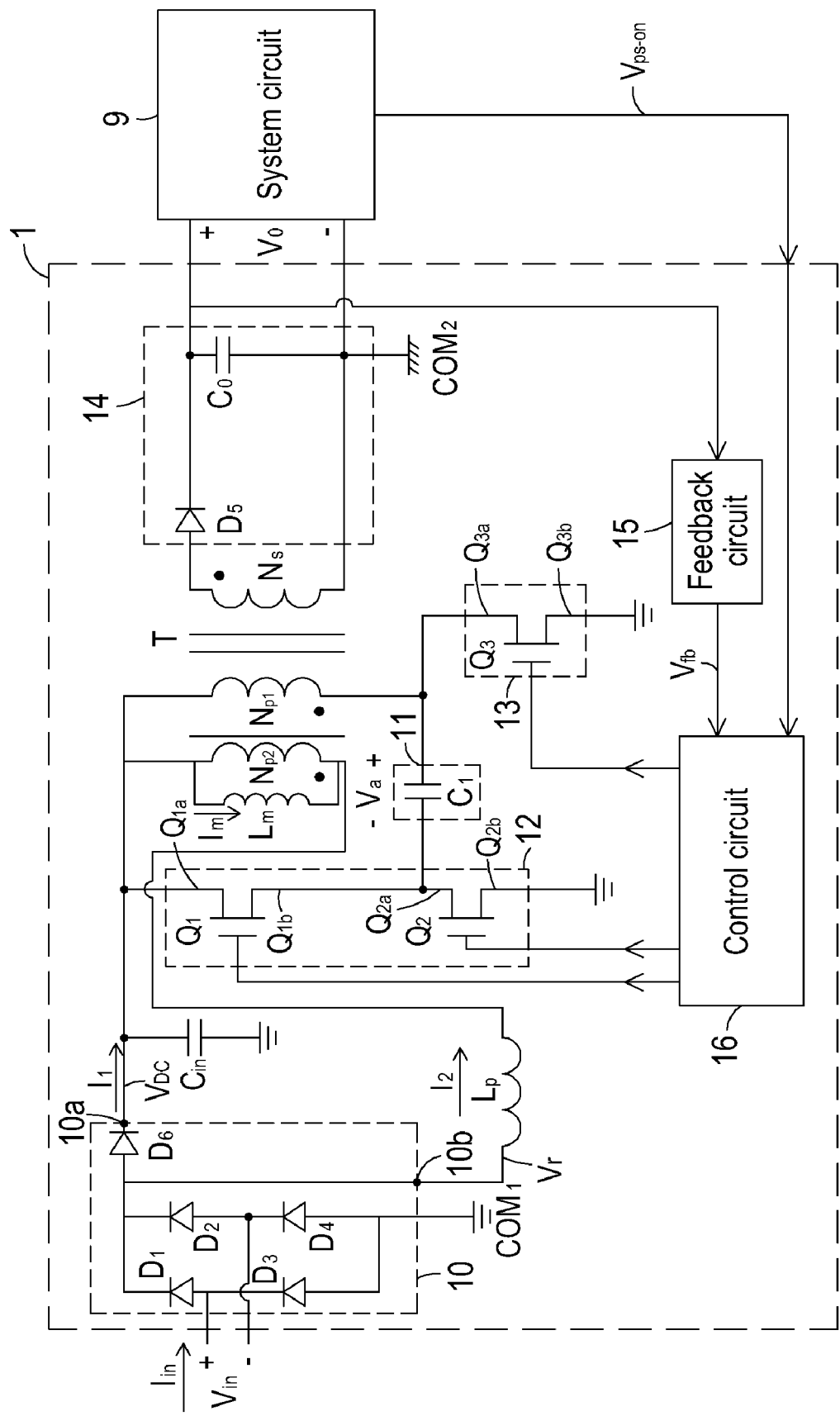
FIG. 5 is a schematic circuit diagram of a single-stage switching power supply according to a fifth preferred embodiment of the present invention.

FIG. 5 is a schematic circuit diagram of a single-stage switching power supply according to a fifth preferred embodiment of the present invention. In comparison with the single-stage switching power supply of FIG. 3, the transformer T further includes a second primary winding assembly $N_{p2}$, the first inductor $L_p$ is not connected to the first switching circuit 12 and the second switching circuit 13. In addition, the first inductor $L_p$ is connected to the second output terminal 10b of the rectifying circuit 10 and the second end of the second primary winding assembly $N_{p2}$. The first end of the second primary winding assembly $N_{p2}$ is connected to the first end of the first primary winding assembly $N_{p1}$, the first output terminal 10a of the rectifying circuit 10, the input capacitor $C_{in}$ and the first switching circuit 12. The turn ratio of the first primary winding assembly $N_{p1}$ to the second primary winding assembly $N_{p2}$ is k.

The timing waveform diagrams of related voltage signals, current signals, and the statuses of the switch elements described in the single-stage switching power supply of FIG. 5 are similar to those described in FIGS. 4A, 4B and 4C, and are not redundantly described herein. In other words, the single-stage switching power supply can correct power factor during the operating-status signal $V_{ps\text{-}on}$ is at the normal operating status or the standby state. When the magnetizing inductor $L_m$ and the first inductor $L_p$ are at the charge state and the voltage difference between both ends of the first inductor $L_p$ is equal to $(V_r-(V_o/k))$, the second current $I_2$ is increased at a slope of $(V_r-(V_o/k))/L_p$, $(51\ V_p\cdot\sin(\omega t)|-(V_o/k))/L_p$ or $(|V_{in}|-(V_o/k))/L_p$ and flows through the first inductor $L_p$, the second primary winding assembly $N_{p2}$ and the magnetizing inductor $L_m$. When the magnetizing inductor $L_m$ and the first inductor $L_p$ are at the discharge state and the voltage difference between both ends of the first inductor $L_p$ is equal to $(V_p+(nV_o/k)-V_r)$, the second current $I_2$ is decreased at a slope of $(V_p+(nV_o/k)-V_r)/L_p$, $(V_p+(nV_o/k)-|V_p\cdot\sin(\omega t)|)/L_p$ or $(V_p+(nV_o/k)-|V_{in}|)/L_p$ and flows through the first inductor $L_p$, the second primary winding assembly $N_{p2}$ and the magnetizing inductor $L_m$.

Figure 6:
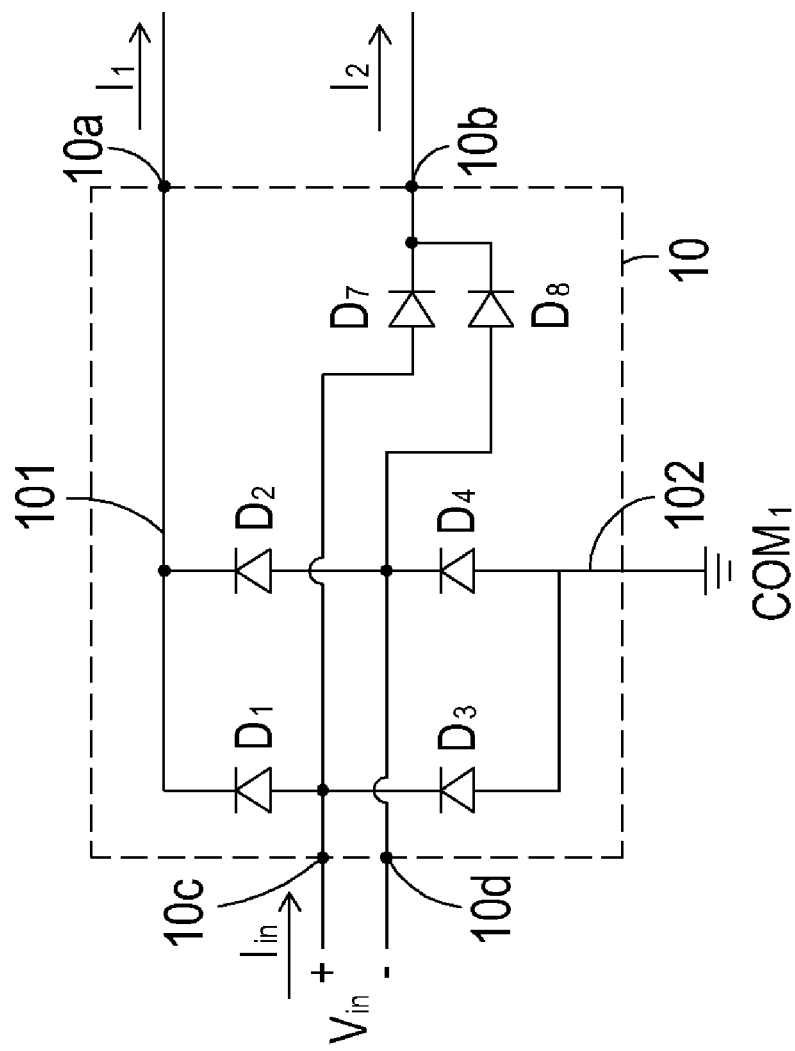
FIG. 6 a schematic circuit diagram illustrating another exemplary rectifying circuit used in the single-stage switching power supply of the present invention.

FIG. 6 a schematic circuit diagram illustrating another exemplary rectifying circuit used in the single-stage switching power supply of the present invention. The rectifying circuit 10 of FIG. 6 includes a bridge rectifier that comprises a first diode $D_1$, a second diode $D_2$, a third diode $D_3$ and a fourth diode $D_4$. In comparison with the rectifying circuit of FIG. 3, the rectifying circuit 10 of FIG. 6 does not include the sixth diode $D_6$ but further includes a seventh diode $D_7$ and an eight diode $D_8$. The seventh diode $D_7$ is interconnected between a first input terminal 10c and the second output terminal 10b of the rectifying circuit 10. The eight diode $D_8$ is interconnected between a second input terminal 10d and the second output terminal 10b of the rectifying circuit 10.

Since the loop of the first current $I_1$ from the first output terminal 10a of the rectifying circuit 10 passes through two diodes and the second current $I_2$ from the second output terminal 10b of the rectifying circuit 10 passes through two diodes, the power consumption by the diodes are relatively reduced and the overall performance is enhanced.

In some embodiments, the rectifying circuit 10 is exempted from the single-stage switching power supply 1. Under this circumstance, the first DC voltage $V_{DC}$ is directly received by the single-stage switching power supply 1. Likewise, in response to the operating-status signal $V_{ps\text{-}on}$ the first switching circuit 12 and the second switching circuit 13 are alternately enabled, so that the electric energy of the first DC voltage $V_{DC}$ is transmitted from the first primary winding assembly $N_{p1}$ to the secondary winding assembly $N_s$. When the first switching circuit 12 is enabled, more electric energy is transmitted from the single-stage switching power supply 1 to the system circuit 9. On the other hand, when the second switching circuit 13 is enabled, the switching loss is reduced.

From the above description, the single-stage switching power supply of the present invention is capable of adaptively enabling proper number of switch elements in order to reduce the switching loss at the standby status and enhance the overall performance. As a consequence, the single-stage switching power supply electronic device has a lower operating temperature at the standby status and the possibility of burning or damaging the electronic device is largely reduced. In addition, the power factor of the single-stage switching power supply is improved. Since the AC current inputted into the switching power supply is no longer centrally distributed, the harmonic wave generated by the switching power supply fails to interfere with other electronic devices. Since the power factor is increased and the apparent power is reduced, the power loss is low. Moreover, since the circuitry configuration of the single-stage switching power supply is simplified and no additional power factor correction circuit is connected to the input side of the single-stage switching power supply, the single-stage switching power supply of the present invention is cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A single-stage switching power supply for generating an output voltage to a system circuit, said single-stage switching power supply comprising:
    a transformer having a first primary winding assembly and a secondary winding assembly;
    a voltage level generation circuit connected to the first primary winding assembly for generating an auxiliary voltage;
    a first switching circuit connected to said first primary winding assembly, an input-side common terminal and said voltage level generation circuit, and including a first switch element and a second switch element;
    a second switching circuit connected to said voltage level generation circuit, said first primary winding assembly and said input-side common terminal, and including a third switch element;
    a rectifying and filtering circuit connected to said secondary winding assembly and said system circuit for rectifying, filtering and generating said output voltage;
    a feedback circuit connected to said rectifying and filtering circuit and generating a feedback signal in response to said output voltage; and
    a control circuit connected to said first switching circuit, said second switching circuit, said feedback circuit and said system circuit, wherein in response to said feedback signal and an operating-status signal issued by said system circuit, said first switching circuit and said second switching circuit are alternately enabled under control of said control circuit such that electric energy of a first DC voltage is transmitted from said first primary winding assembly to said secondary winding assembly, wherein said first switching circuit is disabled but said second switching circuit is enabled under control of said control circuit when said operating-status signal is at a standby operating status.

2. The single-stage switching power supply according to claim 1 further comprising an input capacitor, which is interconnected between said first primary winding assembly and said input-side common terminal, for filtering said first DC voltage.

3. The single-stage switching power supply according to claim 1 further comprising a rectifying circuit, wherein a first output terminal of said rectifying circuit is connected to said first primary winding assembly for rectifying an input AC voltage into said first DC voltage, and said first DC voltage is outputted from said first output terminal of said rectifying circuit.

4. The single-stage switching power supply according to claim 3 wherein said rectifying circuit comprises a bridge rectifier including a first diode, a second diode, a third diode and a fourth diode, wherein an positive output terminal of said bridge rectifier is connected to said first output terminal of said rectifying circuit, and an negative output terminal of said bridge rectifier is connected to said input-side common terminal.

5. The single-stage switching power supply according to claim 3 wherein the single-stage switching power supply further includes a first inductor and said rectifying circuit further includes a second output terminal, said rectifying circuit issues a rectified output voltage from said second output terminal, and first inductor is interconnected between said transformer and said second output terminal of said rectifying circuit.

6. The single-stage switching power supply according to claim 5 wherein an end of said first inductor is connected to said second output terminal of said rectifying circuit, and the other end of said first inductor is connected to said first primary winding assembly, said voltage level generation circuit and said second switching circuit.

7. The single-stage switching power supply according to claim 5 wherein said transformer further comprises a second primary winding assembly, said first inductor is connected to said second output terminal of said rectifying circuit and an end of said second primary winding assembly, and the other end of said second primary winding assembly is connected to said first primary winding assembly, said first output terminal of said rectifying circuit and said first switching circuit.

8. The single-stage switching power supply according to claim 5 wherein said rectifying circuit comprises a bridge rectifier including a first diode, a second diode, a third diode and a fourth diode, and a sixth diode, wherein said sixth diode is interconnected between a positive output terminal of said bridge rectifier and said first output terminal of said rectifying circuit, and said second output terminal of said rectifying circuit is connected to a positive end of said sixth diode and a positive output terminal of said bridge rectifier.

9. The single-stage switching power supply according to claim 5 wherein said rectifying circuit comprises a bridge rectifier including a first diode, a second diode, a third diode and a fourth diode, and a seventh diode and an eighth diode, wherein said seventh diode is interconnected between a first input terminal and said second output terminal of said rectifying circuit, and said eighth diode is interconnected between a second input terminal and said second output terminal of said rectifying circuit.

10. The single-stage switching power supply according to claim 1 wherein the number of switch elements of said first switching circuit is more than that of said second switching circuit.

11. The single-stage switching power supply according to claim 1 wherein said voltage level generation circuit includes a first capacitor or an auxiliary transformer.

12. The single-stage switching power supply according to claim 1 wherein said rectifying and filtering circuit comprises:
    a fifth diode having a positive end connected to an end of said secondary winding assembly and a negative end connected to an end of said system circuit; and
    an output capacitor having an end connected to said negative end of said fifth diode and the other end connected to the other end of said system circuit, the other end of said secondary winding assembly and an output-side common terminal.

13. The single-stage switching power supply according to claim 1 wherein said first switching circuit is enabled but said second switching circuit is disabled under control of the control circuit when said operating-status signal is at a normal operating status.

14. A single-stage switching power supply for generating an output voltage to a system circuit, said single-stage switching power supply comprising:
- a transformer having a first primary winding assembly, a second primary winding assembly and a secondary winding assembly;
- a voltage level generation circuit connected to the first primary winding assembly or said second primary winding assembly for generating an auxiliary voltage;
- a first switching circuit connected to said first primary winding assembly, said second primary winding assembly, an input-side common terminal and said voltage level generation circuit, and including a first switch element and a second switch element;
- a second switching circuit connected to said first primary winding assembly or said second primary winding assembly and said input-side common terminal, and including a third switch element;
- a rectifying and filtering circuit connected to said secondary winding assembly and said system circuit for rectifying and filtering and generating said output voltage;
- a feedback circuit connected to said rectifying, filtering circuit and generating a feedback signal in response to said output voltage; and
- a control circuit connected to said first switching circuit, said second switching circuit, said feedback circuit and said system circuit, wherein in response to said feedback signal and an operating-status signal issued by said system circuit, said first switching circuit and said second switching circuit are alternately enabled under control of said control circuit such that electric energy of a first DC voltage is transmitted from said first primary winding assembly or said second primary winding assembly to said secondary winding assembly, wherein said first switching circuit is disabled but said second switching circuit is enabled under control of said control circuit when said operating-status signal is at a standby operating status.

15. The single-stage switching power supply according to claim 14 wherein an end of said second primary winding assembly is connected to an end of said first primary winding assembly and said first switching circuit, the other end of said second primary winding assembly is connected to said second switching circuit, said second switching circuit is interconnected between the other end of said second primary winding assembly and said input-side common terminal, an end of said voltage level generation circuit is connected to the other end of said first primary winding assembly, and the other end of said voltage level generation circuit is connected to said first switching circuit.

16. The single-stage switching power supply according to claim 14 wherein an end of said second switching circuit is connected to said first primary winding assembly, and an end of said voltage level generation circuit is connected to said second primary winding assembly.

17. The single-stage switching power supply according to claim 14 further comprising an input capacitor, which is interconnected between said first primary winding assembly and said input-side common terminal, for filtering said first DC voltage.

18. The single-stage switching power supply according to claim 14 further comprising a rectifying circuit, wherein a first output terminal of said rectifying circuit is connected to said first primary winding assembly and said second primary winding assembly for rectifying an input AC voltage into said first DC voltage, and said first DC voltage is outputted from said first output terminal of said rectifying circuit.

19. The single-stage switching power supply according to claim 14 wherein the number of switch elements of said first switching circuit is more than that of said second switching circuit.

20. The single-stage switching power supply according to claim 14 wherein said first switching circuit is enabled but said second switching circuit is disabled under control of the control circuit when said operating-status signal is at a normal operating status.

* * * * *